US 6,621,629 B2

(12) United States Patent
Blumenthal et al.

(10) Patent No.: US 6,621,629 B2
(45) Date of Patent: Sep. 16, 2003

(54) MAGNIFIER FOR CONTAINER LABELS SUCH AS MEDICATION CONTAINERS OR THE LIKE

(76) Inventors: Denis Blumenthal, 9956 Fonte Rd., Cypress, CA (US) 90630; Paul S. Entin, 10351 Amberwood Cir., Fountain Valley, CA (US) 92708

( * ) Notice: Subject to any disclaimer, the term of this patent is extended or adjusted under 35 U.S.C. 154(b) by 83 days.

(21) Appl. No.: 09/775,065

(22) Filed: Feb. 1, 2001

(65) Prior Publication Data

US 2002/0101656 A1 Aug. 1, 2002

(51) Int. Cl.[7] ................................................ G02B 27/02
(52) U.S. Cl. ...................... 359/440; 359/442; 359/802; 359/441
(58) Field of Search .......................... 359/436, 440–442, 359/802–803, 742–743, 710, 711

(56) References Cited

U.S. PATENT DOCUMENTS 4,178,071 A * 12/1979 Asbell

* cited by examiner

Primary Examiner—James Phan
(74) Attorney, Agent, or Firm—Roy A. Ekstrand

(57) ABSTRACT

A magnifier for use upon labels such as labels found on medication containers or the like includes a flexible generally planar sidewall having a predisposed inward resilient curvature causing the sidewall to tend to wrap inwardly upon itself. The sidewall supports an enlarged magnifying lens portion. The sidewalls may be flexed outwardly to enlarge the enclosed volume therein and facilitate insertion of a conventional container having printed information on the outer surface or a label thereof. The portion of the printed material beneath the magnifying lens portion is enlarged to facilitate easier reading thereof. In an alternate embodiment, a cylindrical sidewall is supported by the movable cap portion of a child proof container cap and further supports a magnifying lens portion.

8 Claims, 2 Drawing Sheets

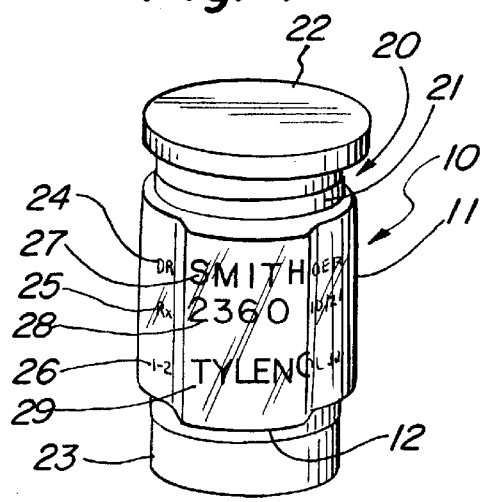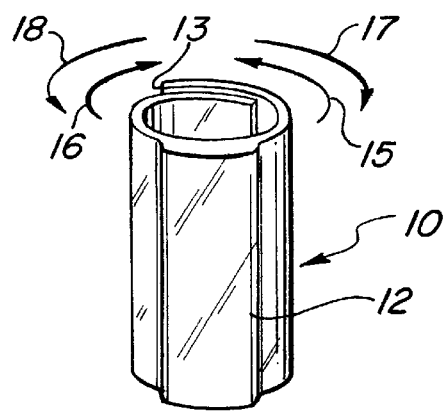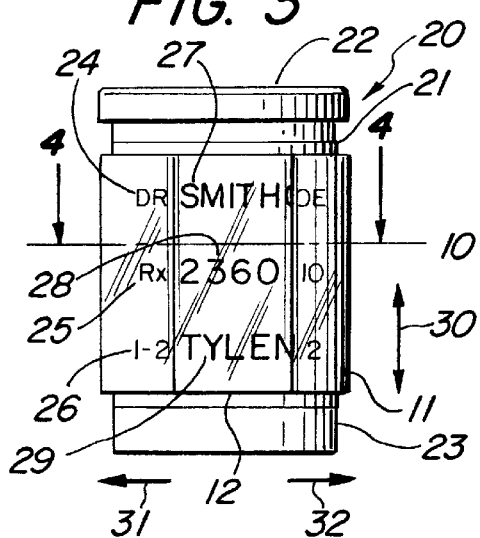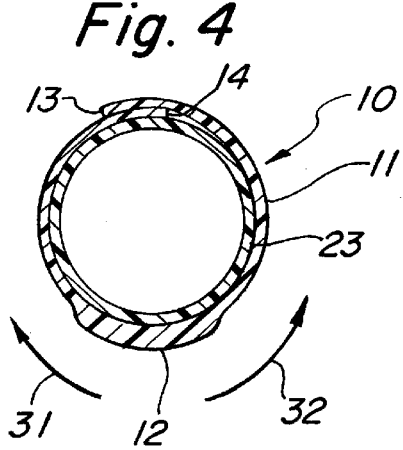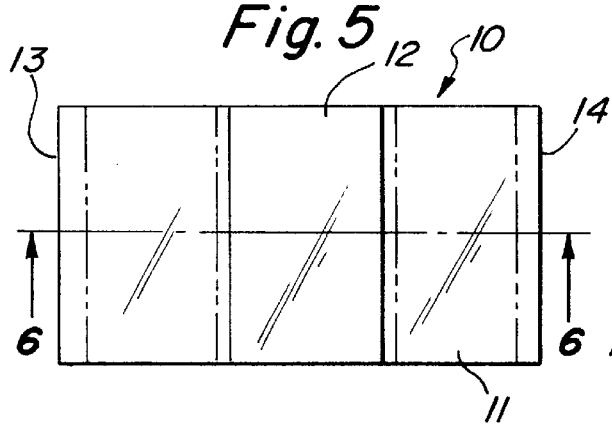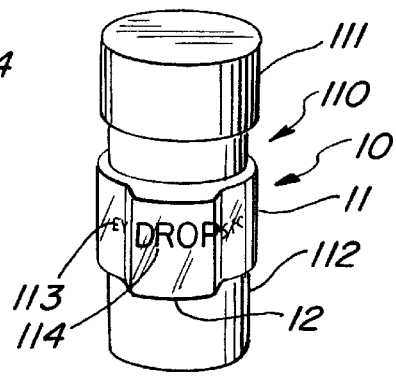

Fig. 6
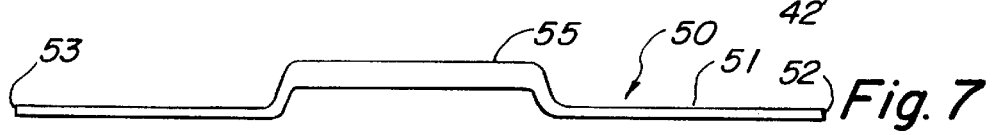
Fig. 7
Fig. 8
Fig. 9
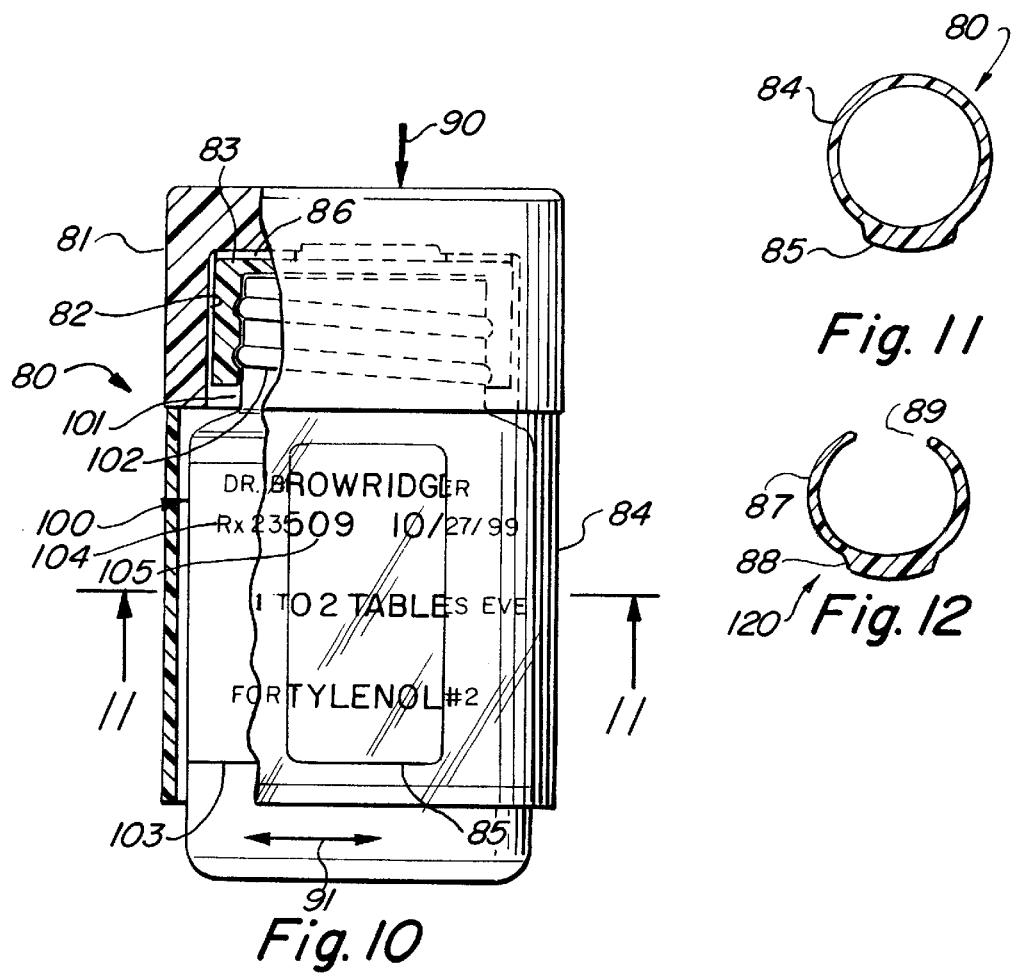
Fig. 10
Fig. 11
Fig. 12

MAGNIFIER FOR CONTAINER LABELS SUCH AS MEDICATION CONTAINERS OR THE LIKE

FIELD OF THE INVENTION

This invention relates generally to containers and the reading of the labels thereon and relates particularly to small containers such as those used for prescription medications.

BACKGROUND OF THE INVENTION

A variety of consumer products are packaged in relatively small containers such as small plastic or glass bottles and the like. Often, the outer surface of such small containers supports a label upon which important information is printed. Perhaps one of the most pervasive small containers of the type to which the present invention relates is found in prescription medication containers.

Typically, prescription medication containers are generally cylindrical in shape defining outer cylindrical surface portions upon which a relatively large label is adhesively secured. The label functions to provide a substantial amount of information for the prescription medication consumer. Such information usually includes items such as the name of the medication, the required dosage, identification names and phone numbers of the prescribing physician and pharmacy, prescription identification number and other information such as precautions and manner of use.

The use of labels bearing this great amount of information printed thereon in combination with relatively small containers necessitates the use of relatively small or fine print. Such small or fine print may be hard for individuals with normal eyesight to read. However, the problem is exacerbated by the disproportionate use of prescription medications by elderly consumers as well as other consumers having reduced eyesight or vision capability.

While the problem of small print upon container labels is a serious problem in prescription medication packaging, the difficulty is not limited to prescription medication labels and containers. Many other consumer products such as cosmetics, lipstick, nonprescription vitamins and so-called homeopathic remedies which often use similar small containers having relatively fine print on their labels.

The general and persistent problem associated with the need to provide product labels having relatively small print has prompted practitioners in the art to produce various devices in this general art area. For example, U.S. Pat. No. 5,193,032 issued to Hirth sets forth a UNIVERSAL PRESCRIPTION BOTTLE INSTRUCTION LABEL MAGNIFIER which includes a housing member designed to accommodate prescription bottles of various popular sizes therein in a fixed position. A longitudinally movable magnifying lens slidably mounted on the housing member is used to magnify the print contained on the instruction label located on the side of the prescription bottle.

U.S. Pat. No. 6,001,082 issued to Dair, et al. sets forth a MEDICATION DELIVERY PIN WITH AN INTEGRAL MAGNIFYING POCKET CLIP for use in setting the desired dose of a medication to be dispensed by a medication delivery pen. The magnifier is integral with the pocket clip of the medication delivery pen such that the magnifier extends over a window through which the user sees the dosage being dispensed.

A magnification device consisting of a magnifying lens for enlarging prescription labels and containers for holding prescription bottles is marketed by Innovative Medical Services, Inc., a California corporation, under the trademark "Medifier".

Other U.S. patent such as U.S. Pat. No. 5,967,350 issued to Jones and U.S. Pat. No. 5,791,513 issued to Intini set forth medication containers of the type generally related to the present invention.

While the foregoing described prior art devices have to some extent improved the art and have in some instances enjoyed commercial success, they have often been found to be unduly costly and, in some instances, ineffective. There remains, therefore, a continuing need in the art for ever improved, low cost and easy to use apparatus for magnifying the small print on small container labels such as prescription medication containers and the like.

SUMMARY OF THE INVENTION

Accordingly, it is a general object of the present invention to provide an improved magnifier for container labels. It is a more particular object of the present invention to provide an improved magnifier for container labels such as those used on prescription medication containers or the like. It is a still more particular object of the present invention to provide an improved magnifier for use on container labels which is extremely low in manufacturing cost and which is easy to utilize by persons having limited eyesight and vision.

In accordance with the present invention, there is provided a magnifier for use in enlarging selected portions of information disposed upon a container, the magnifier comprising: a generally planar sidewall having opposed ends, the sidewall being formed of a resilient flexible relatively thin material having a preformed inwardly curving characteristic whereby the ends tend to roll upon each other; and a magnifying lens portion formed on the sidewall having a thickness sufficient to form an enlarging lens characteristic, the flexible sidewall being sufficiently flexible to allow a portion of a container to be inserted into the magnifier and being sufficiently resilient to cause the sidewall to wrap upon a container thus inserted whereby the magnifying lens portion is held against the inserted container.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a perspective view of a typical prescription medication container supporting a magnifier constructed in accordance with the present invention;

FIG. 2 sets forth a perspective view of the present invention magnifier separated from a container;

FIG. 3 sets forth a front view of the present invention magnifier supported upon a typical prescription medication container;

FIG. 4 sets forth a section view of the magnifier shown in FIG. 3 taken along section lines 4—4 therein;

FIG. 5 sets forth a plan view of the present invention magnifier flattened to assume a generally planar configuration;

FIG. 6 sets forth a section view of the present invention magnifier in the flattened configuration of FIG. 5 taken along section lines 6—6 therein;

FIG. 7 sets forth a section view of an alternate embodiment of the present invention magnifier in its flattened configuration;

FIG. 8 sets forth a section view of a further alternate embodiment of the present invention magnifier in its flattened configuration;

FIG. 9 sets forth a section view of a still further alternate embodiment of the present invention magnifier in its flattened configuration;

FIG. 10 sets forth a partially sectioned front view of a conventional prescription medication container supporting a magnifier constructed in accordance with a still further alternate embodiment of the present invention;

FIG. 11 sets forth a section view of the alternate embodiment of FIG. 10 taken along section lines 11—11 therein;

FIG. 12 sets forth a section view of a still further alternate embodiment of the present invention magnifier; and FIG. 13 sets forth a perspective view of the present invention magnifier supported upon an illustrative cosmetic article such as a lipstick container or the like.

DESCRIPTION OF THE PREFERRED EMBODIMENTS

FIG. 1 sets forth a perspective view a magnifier constructed in accordance with the present invention and generally referenced by numeral 10 together with a typical container generally referenced by numeral 20. Container 20 is fabricated in accordance with conventional fabrication techniques such as those employed to fabricate prescription medication containers or the like. However, as set forth below and as mentioned above, it will be understood that the present invention magnifier for container labels is usable on virtually any suitably shaped container having printed material supported thereon.

Thus, container 20 being typical of prescription medication containers includes a cap 22 and a cylindrical body having a generally cylindrical sidewall 23. Sidewall 23 in turn supports a printed label 21. Label 21 supports a plurality of printed material lines 24, 25 and 26.

In accordance with the present invention, magnifier 10 is formed in the manner set forth below in greater detail and includes a flexible sidewall 11 supporting an enlarged magnifying lens portion 12. As is better seen in FIG. 2 and described below, magnifier 10 is formed of a thin flexible material having a predisposed curvature or tendency to roll inwardly upon itself.

Returning to FIG. 1, magnifier 10 which is preferably formed of a transparent or clear material such as plastic or the like is secured upon label 21 of container 20 by the memory of flexible sidewall 11. Magnifying lens portion 12 enlarges the underlying portion of print lines 24, 25 and 26 to produce enlarged print portions 27, 28 and 29 respectively. In further accordance with an important aspect of the present invention, flexible sidewall 11 holds magnifier 10 securely upon container label 21 while facilitating both rotational and up and down movement of magnifier 10 with respect to label 21 in the manner shown below in FIG. 3. The importance of the easy movement of magnifier 10 is found in the ability of the user to scroll horizontally or vertically in searching out and reading portions of the print material upon label 21 by moving the position of magnifying lens portion 12. In this manner, the user is able to easily read relatively small print lines and print areas upon label 21. Magnifier 10 may be allowed to remain secured to container 20 throughout its use or, alternatively, may be easily removed by simply withdrawing magnifier 10 from container 20 which withdrawal is facilitated by the flexibility of sidewall 11.

FIG. 2 sets forth a perspective view of magnifier 10 having been separated from container 20. As described above, magnifier 10 is preferably formed of a transparent or clear plastic material or other suitable flexible material and defines a generally planar sidewall 11 having end portions 13 and 14 together with an enlarged magnifying lens portion 12. In the preferred fabrication of the present invention, magnifier 10 is formed such that lens portion 12 and sidewall 11 are formed as an integral molded or extruded member. An important aspect of the present invention magnifier is shown in FIG. 2 in that the preformed or predisposed inwardly wrapping or curving memory characteristic of sidewall 11 is shown. Thus, in the absence of the insertion of a container such as container 20 shown in FIG. 1, sidewall 11 wraps about itself in the manner shown due to the predisposed or preformed inward elastic force shown by arrows 15 and 16. This resilient elastic force provides the gripping force when ends 13 and 14 of sidewall 11 are forced outwardly against the resilient characteristic thereof in the directions indicated by arrows 17 and 18 respectively to enlarge the surrounded space within magnifier 10 and facilitate the insertion of a container such as container 20 shown in FIG. 1. Once the container has been inserted, the resilient forces upon sidewall 11 wrap magnifier 10 upon the container sidewall in the manner shown in FIG. 1 thereby allowing an adhesive-free movable grip of attachment for magnifier 10.

FIG. 3 sets forth a front view of magnifier 10 supported upon container 20. As described above, container 20 is fabricated in accordance with conventional fabrication techniques and defines a cap 22 and a sidewall 23 which supports a label 21 which in turn supports a plurality of printed information lines 24, 25 and 26. As also described above, magnifier 10 is supported upon container 20 overlying label 21 by the above-described flexing and relaxing of sidewall 11. Thus, magnifier 10 includes sidewall 11 wrapped upon label 21 of container 20 and a magnifying lens portion 12. Magnifying lens portion 12 enlarges the underlying portions of print lines 24, 25, and 26 to produce enlarged print portions 27, 28 and 29. Enlarged print portions 27 through 29 are thus easily read by individuals through the magnification of lens 12.

In accordance with an important aspect of the present invention, the adhesive free attachment of magnifier 10 upon label 21 allows magnifier 10 to be moved to reposition magnifying lens 12 over the desired portion or portions of label 21. Thus, magnifier 10 may be moved vertically in the directions indicated by arrows 30 or, alternatively, may be turned upon container 20 in either direction as indicated by arrows 31 and 32. The use of a movable magnifier upon container 20 allows a relatively small magnifying lens portion to be maximally and effectively used while minimizing the enlargement of the overall size of the combination of container 20 and magnifier 10.

FIG. 4 sets forth a section view of magnifier 10 and container 20 taken along section lines 4—4 in FIG. 3. Of importance to note in FIG. 4 is the characteristic by which the flexible inwardly curved resilient sidewalls of the present invention magnifier resiliently wrap about the host container to provide an adhesive-free attachment therebetween.

More specifically, a generally cylindrical sidewall 23 of container 20 (seen in FIG. 3) receives a sidewall 11 and magnifying lens portion 12 of the present invention magnifier referenced by numeral 10. As can be seen in FIG. 4, the resilient flexible inwardly curved structure of sidewall 11 wraps end portions 13 and 14 thereof securely about sidewall 23. Arrows 31 and 32 illustrate the rotational movement in either direction facilitated by the flexible resilient wrapping of sidewall 11 which allows magnifying lens portion 12 to be moved to enlarge the desired print areas of the container label.

FIG. 5 sets forth a plan view of the present invention magnifier having the magnifier flattened to a generally planar configuration. It will be understood that magnifier 10 does not naturally assume the flattened planar shaped shown in FIG. 5 but rather that this planar configuration is only obtained for illustration purposes by depicting the magnifying device having been forcibly flattened against an imaginary plane or the like. Thus, magnifier 10 is generally rectangular in shape and defines a rectangular sidewall 11 having a magnifying lens portion 12 at the approximate center thereof together with ends 13 and 14. It will be understood that while a generally centered position of magnifying lens portion 12 is anticipated for most fabrications of magnifier 10, the present invention is not limited to any such centralized location. Thus, magnifying lens portion 12 may be supported upon sidewall 11 at either left or right hand positions as shown in dashed-line representation in FIG. 5 without departing from the spirit and scope of the present invention.

FIG. 6 sets forth a section view of magnifier 10 shown in its flattened configuration taken along section lines 6—6 in FIG. 5. By way of overview, it will be noted that the section views shown in FIGS. 6 through 9 are illustrative of alternative embodiments of the present invention magnifier and may be generally assumed to be taken along section lines 6—6 for their respective alternative embodiments in a flattened configuration.

More specifically, FIG. 6 sets forth an alternate embodiment of the present invention magnifier generally referenced by numeral 40 having a planar sidewall 41, having ends 42 and 43 and a generally cylindrical magnifying lens portion 45.

FIG. 7 sets forth a section view of a further alternate embodiment of the present invention magnifier having a sidewall 51 supporting a raised magnifying lens portion 55 together with end portions 52 and 53. The embodiment of FIG. 7 generally referenced by numeral 50 envisions the application of a magnifying lens portion which maintains a spaced position from the underlying label of a container such as container 20 set forth in FIG. 1.

FIG. 8 sets forth a still further alternate embodiment of the present invention magnifier generally referenced by numeral 60 having a sidewall 61 defining ends 62 and 63 having a magnifying lens portion 65. The configuration of the present invention magnifier shown in FIG. 8 as magnifier 60 facilitates the provision of the thickest magnifying lens portion.

FIG. 9 sets forth a section view of a still further alternate embodiment of the present invention magnifier generally referenced by numeral 70 having a planar sidewall 71 and end portions 72 and 73. Magnifier 70 utilizes the well known fresnel lens which utilizes a plurality of spaced often triangularly shaped grooves (not shown) to provide a magnification characteristic. The structure of fresnel lenses is well known in the art and thus it will be understood that the conventional fresnel lens grooves are formed in magnifier 70 without the need for illustrating them in FIG. 9.

FIG. 10 sets forth a partially sectioned front view of a still further alternate embodiment of the present invention magnifier generally referenced by numeral 80. Magnifier 80 is shown supported upon a conventional prescription medication container generally referenced by numeral 100 of the type which utilizes or screw-on type cap. Accordingly, container 100 supports a label 103 upon which printed material such as printed line 104 is supported. In further accordance with conventional fabrication techniques, container 100 defines a narrowed, generally cylindrical container neck 101 having a plurality of threads 102 formed thereon.

In accordance with the present invention, a cap portion 81 defining a receptacle 82 supports a safety lock sleeve 83 within receptacle 82. Safety lock sleeve 83 and cap portion 81 support respective engaging teeth 86 constructed in accordance with conventional fabrication techniques. In further accordance with conventional fabrication techniques, safety lock sleeve 83 defines internal threads which receive threads 102 and thus allow safety lock 83 to be threaded upon container neck 101.

The structure of cap portion 81, safety lock sleeve 83 and teeth 86 may be fabricated in accordance with conventional fabrication techniques to produce a so-called "child proof" type closure cap for container 100. Such child proof caps are well known in the art and function to allow cap portion 81 to rotate upon safety lock sleeve 83 in the absence of a downward force upon cap portion 81 in the direction indicated by arrow 90. The application of such downward force causes teeth 86 to engage with sufficient engagement force that subsequent rotation of cap portion 81 while maintaining the downward force upon safety lock sleeve 83 couples cap portion 81 to safety lock sleeve 83 and thereby rotates safety lock 83 upon neck 101. The assumption involved in this child proof type of closure is that the young child is likely to be unable to provide this simultaneous downward force and turning to manipulate cap 81 and safety lock sleeve 83 and gain access to the contents of container 100.

In accordance with the present invention, magnifier 80 combines the conventional structure of cap portion 81 and safety lock sleeve 83 together with a generally cylindrical sidewall 84 and a magnifying lens portion 85. In the preferred fabrication of the present invention, sidewall 84 is securely attached to cap portion 81 and is movable therewith. Such attachment may be achieved by sonic welding, adhesive attachment, chemical welding or an extremely snug snap-fit all in accordance with conventional fabrication techniques. The important aspect of securing sidewall 84 to cap portion 81 is to ensure sufficient attachment between sidewall 84 and cap portion 81 to cause sidewall 84 to rotate in combination with cap portion 81. Thus, in the anticipated use of magnifier 80, the user would not apply a downward force upon cap portion 81 when manipulating magnifying lens portion 85 with respect to label 103 to magnify or enlarge the desired portion of printed material upon label 103. It will be recalled that in the absence of a downward force upon cap portion 81, cap portion 81 rotates with respect to safety lock sleeve 83 and does not disturb the seal of container 100. In this manner, the user would simply rotate cap portion 81 in either direction as indicated by arrows 91 to move magnify lens portion 85 to the desired portion of label 103. For example, the position shown in FIG. 10 shows enlarged print portion 105 of print line 104 being enlarged by magnifying lens 85.

FIG. 11 sets forth a section view of magnifier 80 taken along section lines 11—11. To avoid unduly cluttering FIG. 11, container 100 is omitted from the drawing. Accordingly, magnifier 80 includes a generally cylindrical sidewall 84 supporting a magnifying lens portion 85.

FIG. 12 sets forth a section view of a further alternate embodiment of the present invention substantially identical to magnifier 80 shown in FIG. 10 with the exception that a gap 89 is formed in the magnifier sidewall. More specifically, magnifier 120 includes a generally cylindrical sidewall 87 having a gap 89 formed therein. Sidewall 87 further supports a magnifying lens portion 88 which may for example be identical to magnifying lens portion 85 shown in magnifier 80.

It will be understood that the embodiments of magnifiers 10, 80 and 120 shown in FIGS. 1, 10, and 12 may utilize any of the above-described alternate embodiment shapes for their respective magnifying lens portions including but not limited to the shapes shown in FIGS. 6 through 9. The important aspect with respect to the present invention in shaping the magnifying lens portion is to provide the desired level of enlargement of magnification of the underlying print information upon the container.

As mentioned above, the present invention magnifier finds extremely advantageous use in combination with containers of the type typically used for prescription medication. However, as is also mentioned above, the present invention magnifier is not limited to use in combination with prescription medication containers but rather may be utilized upon virtually any type of container having information printed or otherwise disposed thereon which is difficult to read. Accordingly, for purposes of illustration, FIG. 13 sets forth an alternative use of the present invention magnifier in combination with a cosmetic container 110. Cosmetic container 110 may, for example, comprise a lipstick container or the like. The important aspect with respect to the present invention is the illustration of container 110 as exemplary of alternative containers. Thus, container 110 may just as well be a different cosmetic item container or other containers such as the types of containers typically used for vitamins, nonprescription or homeopathic remedies or the like.

More specifically, container 110 includes a cap 111 and a generally cylindrical sidewall 112. Magnifier 10 constructed in the manner described above is received upon container 110 and includes a sidewall 11 having a magnifying lens portion 12. Magnifier 10 functions in the same manner described above in FIG. 1 for container 20 and thus is seen showing an enlarged print portion 114 of a line of printed information 113. Printed information 113 may be supported upon sidewall 112 of container 110 through the use of a conventional label or other "printing" operations such as decals, painting, silk screening or photographic processes. The important aspect with respect to the present invention is not the manner in which the printed material is secured to sidewall 12 but rather the characteristic use of relatively small print size which makes the use of the present invention magnifier advantageous.

What has been described is a magnifier for container labels such as medication containers or the like which is formed in a convenient, low cost and easy to utilize manner. The magnifier thus provided is readily fabricated of low cost plastic materials or the like.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A magnifier for use in enlarging selected portions of information disposed upon a container, said magnifier comprising:

a generally planar sidewall having opposed ends, said sidewall being formed of a resilient flexible relatively thin material having a preformed inwardly curving characteristic whereby said ends tend to roll upon each other; and a magnifying lens portion formed on said sidewall having a thickness sufficient to form an enlarging lens characteristic, said flexible sidewall being sufficiently flexible to allow a portion of a container to be inserted into said magnifier and being sufficiently resilient to cause said sidewall to wrap upon a container thus inserted whereby said magnifying lens portion is held against the inserted container.

2. The magnifier set forth in claim 1 wherein said sidewall and said magnifier lens portion are formed as an integral plastic unit.

3. The magnifier set forth in claim 2 wherein said sidewall is generally planar.

4. The magnifier set forth in claim 3 wherein said magnifying lens portion is substantially greater in thickness than said sidewall.

5. The magnifier set forth in claim 4 wherein said magnifying lens portion defines a curved outer surface.

6. The magnifier set forth in claim 4 wherein said magnifying lens portion defines a generally rectangular cross section.

7. The magnifier set forth in claim 4 wherein said magnifying lens portion is offset from said sidewall.

8. The magnifier set forth in claim 3 wherein said magnifying lens portion defines a fresnel lens.

* * * * *